United States Patent Office 2,759,833
Patented Aug. 21, 1956

2,759,833

REFRACTORY AND PROCESS FOR MAKING SAME

Himansu K. Mitra, Jamshedpur, Bihar, India

No Drawing. Original application April 22, 1953, Serial No. 350,517. Divided and this application March 30, 1955, Serial No. 498,083

1 Claim. (Cl. 106—59)

This invention relates to the manufacture of high grade refractories containing forsterite (magnesium orthosilicate) as a major constituent. This is a divisional application of co-pending application Serial No. 350,517, filed April 22, 1953.

In the past the production of a high grade refractory material of the type aforesaid it has been the practice to use only such magnesium silicate rocks which are of the refractory grade and which contain large proportions of magnesium orthosilicate. In such ores, the proportion of magnesia to silica is therefore high. Further, the ores hitherto used are of the non-hydrous variety and therefore loss on ignition has been practically nil.

Thus, Goldschmidt [Goldschmidt V. M., "Olivine and forsterite refractories in Europe," Industrial & Eng. Chemistry, 30 (I), 32–34 (1938)] used a Norwegian olivine having a $SiO_2$ content of 42%, MgO—50%, loss on ignition 0.5%. The molecular ratio of MgO to $SiO_2$ was 1.80.

Birch and Harvey [Birch R. E. and Harvey F. A., "Forsterite and other magnesium silicates as refractories," J. Am. Ceram. Soc. 18 (16), 176–191] used American dunites whose composition was $SiO_2$—40%, MgO—49.3% loss on ignition 1% and molecular ratio of $MgO:SiO_2$ 1.84.

North Carolina olivines reported by Greaves Walker and Stone [Greaves-Walker A. F. & Stone R. L., "The production of unfired and fired forsterite refractories from North Carolina dunites," Bull. No. 16, Eng. Expt. Stn., State College Stn., Raleigh, N. C. (1938)] similarly has a $MgO:SiO_2$ ratio of 1.83 with $SiO_2$—40%, MgO—49% and loss on ignition nil.

In all the aforesaid examples the ratio of magnesia to silica is high and therefore these are of the refractory grade.

Moreover, loss on ignition in all the above examples is negligible, which indicates that the use of the nonhydrous refractory variety for making refractories containing forsterite as a major constituent is essential.

The use of hydrous variety has not been previously possible. The reason for this is that present-day processes of manufacture, if applied to the hydrous variety, will lead to cracking or disintegrating of any refractory shapes made thereby, due to the escape of combined water.

The object of the present invention is to make it possible to utilize the non-refractory hydrous variety of magnesium silicate rock. One such example is shown below and can be utilized for the manufacture of high grade refractories having superior physical properties.

(a) *Chemical analysis*

| | Percent |
|---|---|
| $SiO_2$ | 41.80 |
| $Al_2O_3$ | 0.52 |
| FeO | 6.31 |
| $Fe_2O_3$ | 2.86 |
| $Cr_2O_3$ | 0.58 |
| MgO | 35.92 |
| Loss | 11.90 |
| | 99.89 |

(b) *Pyrometric cone equivalent (melting point)*

Orton Cone 14–16 (1400° C.–1465° C.). For this sample the molecular ratio of $MgO:SiO_2$ is low, being 1.288.

According to this invention, the composition for the manufacture of a refractory material comprises non-refractory, hydrous magnesium silicate rock and amorphous magnesium oxide, the two being calcined or heated together in an oxidizing atmosphere to a temperature not less than that corresponding to Orton Cone 26 (1595° C.) and preferably to Orton Cone 31 (1680° C.), such that new compounds are formed.

The hydrous magnesium silicate rock is a dunite rock mostly altered to serpentine. The rock is found fairly distributed all over the world; e. g., in India it is found in Singbhum (State of Bihar); Orissa (India); Norway; England; etc.

The source of magnesium oxide may be the naturally occurring mineral magnesite ($MgCO_3$) or brucite [$Mg(OH)_2$]. It is to be emphasized that the amorphous variety, as distinct from the crystalline variety periclase, is suited to promote the chemical reactions involved in this process and described further below. The nascent, that is, freshly formed amorphous magnesium oxide formed during heating together of the rock and magnesite or brucite is found to give the best results.

In a preferred form, chrome spinel, $MgO:Cr_2O_3$, is introduced into our final product to afford slag resisting properties of a higher degree. To do so, it is necessary to introduce high grade chrome ore. The percentage of $Cr_2O_3$ in the final product as determined by chemical analysis should not be more than 22½% or less than 5%. To introduce the chrome spinel, in the preferred form, the non-refractory, hydrous magnesium silicate rock, magnesium oxide and the chrome ore are calcined together at the temperatures indicated above.

Referring first to the example which is directed to the use of only non-refractory, hydrous magnesium silicate rock and magnesite, it is preferable to grind the magnesite finer than the magnesium silicate rock. The magnesium silicate rock may be crushed and ground to pass through a screen whose openings are not larger than 4 mesh Tyler screen (4.699 mm.). The magnesite, similarly, may be crushed and ground to pass through a screen whose openings are not larger than 20 mesh Tyler screen (0.833 mm.).

If, according to the preferred method, chrome ore is added, it should similarly be ground to pass through 4 mesh Tyler screen, and additional magnesite to pass through 20 mesh Tyler screen.

It has been stated above that magnesite should be ground to a finer degree than the non-refractory, hydrous magnesium silicate rock or chrome ore, but if the magnesium silicate rock and the chrome ore are in a condition to pass through a screen whose openings are not larger than 20 mesh Tyler screen (0.833 mm.) then it is not necessary to grind the magnesite to a degree finer than 20 mesh Tyler screen.

The ground materials viz. magnesium silicate rock and magnesite, are intimately mixed, preferably in a counter-current mixer and heated to the temperature specified above.

Directing attention next to the preferred form, the non-refractory, hydrous magnesium silicate rock, the chrome ore and magnesite are intimately mixed, as described above, and finally heated to the temperature specified.

It has, however, been found that by the addition of chrome ore, the required element viz., chromic oxide, is introduced in the mixture, but at the same time other undesirable elements also enter with the ore, such as $SiO_2$, FeO and $Al_2O_3$ which tend to lower the pyrometric cone equivalent of the refractory material. To correct their deleterious effect MgO or MgCO₃ must be introduced to form forsterite and spinels. It is obvious, therefore, that when introducing chrome ore, a sufficient quantity of raw or calcined magnesite must be added not only to the extent required for the magnesium silicate rock to convert its silica, iron and aluminum oxide contents into forsterite and spinels but also to the extent required for the chrome ore to convert its oxides into forsterite and spinels.

During the heating, chemical reactions take place which break down the structure of the magnesium silicate rock and the chrome ore, when used, and new compounds with high melting points are formed, according to the chemical reactions noted below:

$$2MgO + SiO_2 \rightarrow 2MgO:SiO_2$$
$$MgO + Al_2O_3 \rightarrow MgO:Al_2O_3$$
$$MgO + 2FeO + O \rightarrow MgO:Fe_2O_3$$
$$MgO + Fe_2O_3 \rightarrow MgO:Fe_2O_3$$
$$MgO + Cr_2O_3 \rightarrow MgO:Cr_2O_3$$

From the chemical equations given above the weights of magnesium oxide (or magnesite or brucite) required for one part by weight of each of the above stated ingredients can be determined. For 1 part by weight of each of $SiO_2$, $Al_2O_3$, $FeO$, $Fe_2O_3$, $Cr_2O_3$, the weights of magnesium oxide required are 1.3; 0.4; 0.27; 0.25; 0.24, respectively.

Therefore, for the non-refractory, hydrous magnesium silicate rock described above the amount of MgO required is $$(41.80 \times 1.3) + (0.52 \times 0.4) + (6.31 \times 0.27) +$$
$$(2.86 \times 0.25) + (0.58 \times 0.24)$$
$$= 54.34 + 0.21 + 1.70 + 0.72 + 0.14$$
$$= 57.11$$

i. e. for 100 parts by weight of the raw non-refractory, hydrous magnesium silicate rock it is only necessary to use 57.11 parts by weight of magnesium oxide. But, as will be seen from the composition, 35.92 parts by weight of magnesium oxide are available in the composition itself. Hence, the net amount of magnesium oxide required is 21.19 parts by weight. The corresponding amount of MgCO₃ (magnesite) required is 45.34.

Therefore, 1 part of the non-refractory, hydrous magnesium silicate rock requires 0.21 part MgO or 0.45 part MgCO₃.

The approximate composition of MgCO₃ used is as follows: SiO₂—1.16%; Fe₂O₃—0.20%; CaO—1.00%; MgO—46.70%; loss on ignition 50.70%.

In using magnesium carbonate or magnesium oxide experiments have shown that best results are obtained when using 50% more than the theoretically required amount of magnesium carbonate or magnesium oxide as calculated above. The excess MgCO₃ or MgO enhances the reactions and these take place in the solid state.

The reactions in the case of chrome ore are similar. The chrome ore used in the experimental work had the following approximate composition:

| | |
|---|---|
| SiO₂ | 6.10 |
| Al₂O₃ | 9.60 |
| FeO | 17.55 |
| CaO | 0.30 |
| MgO | 16.56 |
| Cr₂O₃ | 46.95 |
| Loss | 3.51 |

100 parts of this would require 28.08 parts by weight of magnesium oxide. If the amount available in the composition is taken into account, the net requirement is 28.8–16.56 or 11.52 parts of magnesium oxide or 24.65 parts by weight of magnesium carbonate, i. e., 1 part by weight of chrome ore would require 0.11 part of MgO or 0.25 part of MgCO₃. Again 50% more than theoretically required gives the best result.

In the preferred form, 1 part of non-refractory, hydrous magnesium silicate rock and 1 part of high grade chrome ore are mixed with the optimum amount of magnesium carbonate, i. e., 1.05 parts magnesium carbonate (including 50% more, as explained). The mixed mass is calcined in an oxidizing atmosphere in the same manner as for hydrous magnesium silicate rock and magnesium carbonate described above.

While it is intended to introduce approximately 15% chromic oxide in the mixture, it should be noted that the amount of chromic oxide added in the form of chrome ore should not be less than about 5% nor more than about 22½%.

With regard to magnesite, the quantity of raw or calcined magnesite should be such as to convert completely or substantially completely the silica contents of the rock and the chrome ore into forsterite and the iron and aluminum oxides of the rock and the ore into spinels.

It is known that magnesium silicate rocks, magnesium oxide and chrome ore have been combined previously, but the materials used previously have been critically different from those described herein. For the first time, the use of non-refractory, hydrous magnesium silicate rock has been rendered possible, according to the present invention.

The mass after heating or calcination in any commercial type of kiln, is crushed and sieved through different mesh sieves. Different proportions of sieved material are blended together without further crushing, mixed with an organic binder such as molasses and sulphate lye and/or water or lightly calcined magnesite and moulded into bricks or like shapes. These bricks may be used as such or after they have been fired in a kiln.

The refractoriness-under-load of a brick made from the refractory material produced according to this process was tested. The test consisted of subjecting the brick to a load of 2 kg./cm.². The results showed that it did not deform at 1700° C. whereas most commercial grades of brick made from high grade chrome ore and magnesite, under the same load deformed at 1570° C. and completely collapsed at 1650° C.

Although the present invention has been described in conjunction with specific embodiments, nevertheless, various changes and modifications obvious to one skilled in the art are within the spirit, scope and contemplation of the invention.

What is claimed is:

A novel refractory material prepared by mixing together 1 part by weight of non-refractory hydrous magnesium silicate rock containing about 42% by weight of SiO₂ and about 36% by weight of MgO and having a fusion temperature lying in the temperature range corresponding to from Orton Cone 14 to Orton Cone 16, from 0.325 to 0.49 part by weight of amorphous magnesium oxide and high grade chrome ore to the extent of adding a chromic oxide content of from about 5% to about 22½% by weight of said refractory material, all in a state of fine subdivision, the mixture being heated to a temperature from about Orton Cone 26 (1595° C.) to about Orton Cone 31 (1680° C.) such that new compounds are formed.

No references cited.